(12) United States Patent
Müller

(10) Patent No.: US 8,739,277 B2
(45) Date of Patent: May 27, 2014

(54) PROCESS FOR RELEASING THE ACCESS TO A COMPUTER SYSTEM OR TO A PROGRAM

(75) Inventor: Robert Müller, Riemerling (DE)

(73) Assignee: Giesecke & Devrient GmbH, Munich (DE)

( * ) Notice: Subject to any disclaimer, the term of this patent is extended or adjusted under 35 U.S.C. 154(b) by 1708 days.

(21) Appl. No.: 10/583,378

(22) PCT Filed: Dec. 14, 2004

(86) PCT No.: PCT/EP2004/014237
§ 371 (c)(1),
(2), (4) Date: May 14, 2007

(87) PCT Pub. No.: WO2005/059722
PCT Pub. Date: Jun. 30, 2005

(65) Prior Publication Data
US 2008/0036572 A1    Feb. 14, 2008

(30) Foreign Application Priority Data

Dec. 18, 2003 (DE) .................................. 103 59 680

(51) Int. Cl.
*G06F 7/04* (2006.01)
(52) U.S. Cl.
USPC ................. 726/20; 726/9; 713/168; 713/172; 713/185
(58) Field of Classification Search
None
See application file for complete search history.

(56) References Cited

U.S. PATENT DOCUMENTS

| | | | | |
|---|---|---|---|---|
| 6,769,622 B1 * | 8/2004 | Tournemille et al. | .......... | 235/492 |
| 6,793,144 B2 * | 9/2004 | Guez et al. | .................... | 235/492 |
| 6,957,338 B1 * | 10/2005 | Sumino | .......................... | 713/186 |
| 7,188,362 B2 * | 3/2007 | Brandys | ............................ | 726/9 |

FOREIGN PATENT DOCUMENTS

DE     102 11 036 A1     10/2003

OTHER PUBLICATIONS

"Web Authentifizierung mit wibu-key" Keynote, 'Online! No. 2, Oct. 2001, pp. 6-6, XP002317943 Retrieved from the Internet: URL:htpp://wibu.de/files/news/kn2.pdf> 'retrieved on 2005-02-141 p. 6, col. 1, paragraph 1-p. 7, col. 2, paragraph 2; figure1.
"Web-Authentifizierung" Wibu-Magazin, 'Online! Mar. 2003, p. 4, XP002317944 Retrieved from the Internet: URL:http://wibu.de/files/news/kn5.pdf> 'retrieved on Feb. 15, 2005! abstract col. 1, paragraph 2-col. 2, paragraph 5.
Rankl W et al: "Handbuch der Chipkarten, Passage" Handbuch der Chipkarten. Aufbau—Funktionsweise—Einsatz Von Smart Cards, Muenchen : Carl Hanser Verlag, DE, 1999, pp. 450-459, XP002268702 ISBN: 3-446-211115-2 the whole document.

(Continued)

*Primary Examiner* — Kaveh Abrishamkar
(74) *Attorney, Agent, or Firm* — Bacon & Thomas, PLLC

(57) ABSTRACT

The invention relates to a process for releasing the access to a computer system or to a program for a user via a terminal (2) without software having to be installed solely for this purpose on the terminal (2). A data connection is established between a portable data carrier (1) of the user and the terminal (2). An authentication of the user is performed by the portable data carrier (1). If the authentication is successful, an access code is made available by the portable data carrier (1) for releasing the access to the computer system or to the program for a transmission via the data connection.

19 Claims, 2 Drawing Sheets

(56) References Cited

OTHER PUBLICATIONS

De La Puente F et al Institute of Electrical and Electronics Engineers: "Pocket device for authentication and data integrity on internet banking applications" Proceedings 37$^{th}$. Annual 2003 International Carnahan Conference on Security Technology. (ICCST). Taipei, Taiwan, Oct. 14-16, 2003, IEEE International Carnahan Conferrence on Security Technology, New York, NY : IEEE, US, vol. Conf.37, Oct. 14, 2003, pp. 43-50, XP010706183 ISBN: 0-7803-7882-2 abstract p. 43, col. 2, paragraph 2; p. 44, col. 1, paragraph 1; p. 45, col. 1, paragraph 4-col. 2, paragraph 1; p. 45, col. 2, paragraph 6-p. 46, col. 2, paragraph 4.

\* cited by examiner

PROCESS FOR RELEASING THE ACCESS TO A COMPUTER SYSTEM OR TO A PROGRAM

FIELD Of THE INVENTION

The invention relates to a process for releasing the access to a computer system or to a program. Furthermore, the invention relates to a portable data carrier for releasing the access to a computer system or to a program.

BACKGROUND

A number of various approaches and also diverse auxiliary means are known for releasing the access to a computer system or to a program for a user. In many instances in which there are no security requirements that are too high the access is released after the correct inputting of a user ID and of a password. Problems occur, e.g., if the same user has access rights to many computer systems or programs. The user must then have knowledge of a plurality of user ID's and associated passwords.

Instead of manually inputting a password there is also the possibility of providing the user with a portable security data carrier with whose aid an authentication is performed. However, this presupposes that suitable software is installed on the terminal used which software makes access to the portable security data carrier possible. The installation of such software is in particular problematic if the access to the computer system or to the program is to be established for the user by a terminal of a third party. This situation can occur, e.g., in the case in which a field service technician visits a client if said technician would like to access the server of his firm. In such a case, the use of a customary security data carrier is eliminated as a rule since the installation of the software required for using the security data carrier is usually not permitted on the client's terminal. In order to solve this problem, the use of a device that indicates a number on a display when a button is pushed is known. This number is read by the field service technician and registered by the terminal of the client, e.g., as a one-time password in a protected Internet page. Then, the field service technician obtains access to the server of his firm for certain time via the terminal of the client. However, this procedure has the disadvantage that the one-time password must be typed into the terminal. It is furthermore disadvantageous that access to the system can be established by anyone in possession of the device for password generation. The loss of the device can therefore be extremely critical.

SUMMARY

It is the object of the invention to make it possible to release the access to a computer system or to a program via a terminal in a secure manner that is comfortable for the user without installing software provided solely for this purpose on the terminal.

In the process according to the invention for releasing the access to a computer system or to a program for a user via a terminal without software having to be installed solely for this purpose on the terminal, a data connection is established between the portable data carrier of the user and the terminal. An authentication of the user is performed by the portable data carrier. If the authentication is successful, an access code for releasing the access to the computer system or to the program for a transmission via the data connection is made available by the portable data carrier.

The invention has the advantage that the access can be released in a very comfortable manner by using the portable data carrier. The user authentication provided ensures a high security standard. Moreover, it is especially advantageous that no special software must be installed on the terminal for using the portable data carrier. This makes it possible for the user to release the access with the help of the terminal of a third party, on which the user does not have to install any software.

The data connection can be established in particular via a USB interface of the terminal. Since more and more terminals have a USB interface, the process according to the invention consequently can be used in a quite universal manner. It is also advantageous that the portable data carrier can be supplied with its operating voltage via the USB interface and that the portable data carrier therefore does not require its own voltage source.

The authentication can be performed on the basis of secret personal information entered by the user. This has the advantage that a realization is possible with simple means and that no high computing capacity must be reserved. Likewise, it is also possible to perform the authentication on the basis of a biometric process, in particular the checking of a fingerprint of the user. This ensures a particular high security standard.

In a variant of the process according to the invention, the access code is generated by the portable data carrier. In order to make potential attacks more difficult, a random number supplied by the computer system can be taken into account during the generation of the access code. As a result, a different access code is used every time so that spying out the access code does not give a hacker any usable information. In another variant of the process according to the invention, at least one access code protected from unauthorized accesses is stored in the portable data carrier. This eliminates the computing work for generating the access code.

The access code can be made available for transmission via the data connection in a public area of a memory of the portable data carrier. As a result thereof, there is the possibility of transmitting the access code via the data connection by using commands of the terminal. In a further development of the process according to the invention an input device of the terminal is simulated by the portable data carrier. This creates the possibility of transmitting the access code by the portable data carrier as an input of the simulated input device. This has the advantage that no manual command input is required for transmitting the access code. In all variants of the process according to the invention, the access code can be transmitted, e.g., to an Internet page.

In an advantageous embodiment of the process according to the invention, software for establishing a connection to the computer system is stored in the memory of the portable data carrier. This achieves substantial independence from the input device used. In order to design the external access to the memory of the portable data carrier as simply as possible the memory can be operated as a disk drive.

The portable data carrier according to the invention for releasing access to a computer system or to a program for a user via a terminal without software having to be installed solely for this purpose on the terminal has a security chip for making an access code available for releasing the access to the computer system or program. The particularity of the portable data carrier according to the invention is that an equipment is provided for establishing a data connection to the terminal and that an authentication of the user can be performed with the security chip.

The portable data carrier according to the invention is designed in particular in such a manner that it can be connected to a USB interface of the terminal. In a further development, the portable data carrier has a USB hub by means of which the data connection to the terminal is separated in the portable data carrier into several signal paths. As a result, there is the possibility of opening several USB devices, e.g., an input device and an exchangeable data carrier in the terminal via the portable data carrier. Furthermore, the portable data carrier according to the invention can comprise a memory designed as a flash EEPROM. Such a memory can be read with little cost from outside the portable data carrier. In a preferred exemplary embodiment, the portable data carrier according to the invention comprises a sensor for detecting biometric data, in particular a fingerprint sensor.

BRIEF DESCRIPTION OF THE DRAWINGS

The invention is explained in the following using the exemplary embodiments shown in the drawings.

DETAILED DESCRIPTION

Figure 1:
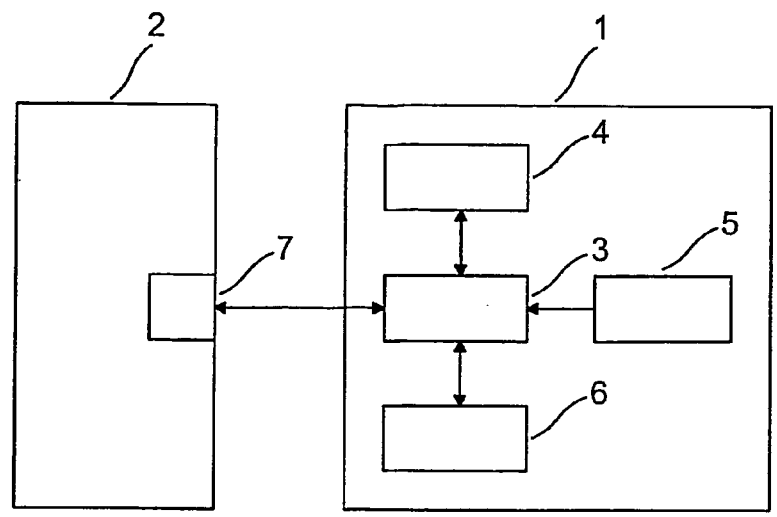
FIG. 1 shows a schematic view of the architecture of an exemplary embodiment of a portable data carrier designed according to the invention that is connected to a personal computer for releasing the access to a computer system or to a program.

FIG. 1 shows a schematic representation of the architecture of an exemplary embodiment for a portable data carrier 1 designed according to the invention that is connected to a personal computer 2 for releasing the access to a computer system or to a program. The portable data carrier 1 is preferably designed as a small device that is also designated as a token and is preferably inserted into a port of the personal computer 2. The portable data carrier 1 comprises an integrated circuit 3 connected to a non-volatile memory 4, a fingerprint sensor 5 and a security chip 6. The integrated circuit 3 is connected externally to a USB interface 7 of the personal computer 2. USB is here the customary abbreviation for Universal Serial Bus. The personal computer 2 is connected in a manner not shown in the figures to a network, e.g., the Internet. An Application-Specific Integrated Circuit, abbreviated ASIC, is preferably used as the integrated circuit 3 and is designed specifically as concerns its mode of operation for the portable data carrier 1. The non-volatile memory 4 is designed in particular as a flash EEPROM. The security chip 6 communicates with the integrated circuit 3 according to the standardized T=1 protocol and can also be a component of a chip card inserted in the portable data carrier 1, depending on the design of the portable data carrier 1. The connecting of the portable data carrier 1 to the USB interface 7 of the personal computer 2 serves on the one hand to supply the portable data carrier 1 with an operating voltage and on the other hand for the transmission of data between the portable data carrier 1 and the personal computer 2. The mode of operation of the portable data carrier 1 is explained in detail using FIG. 2.

Figure 2:
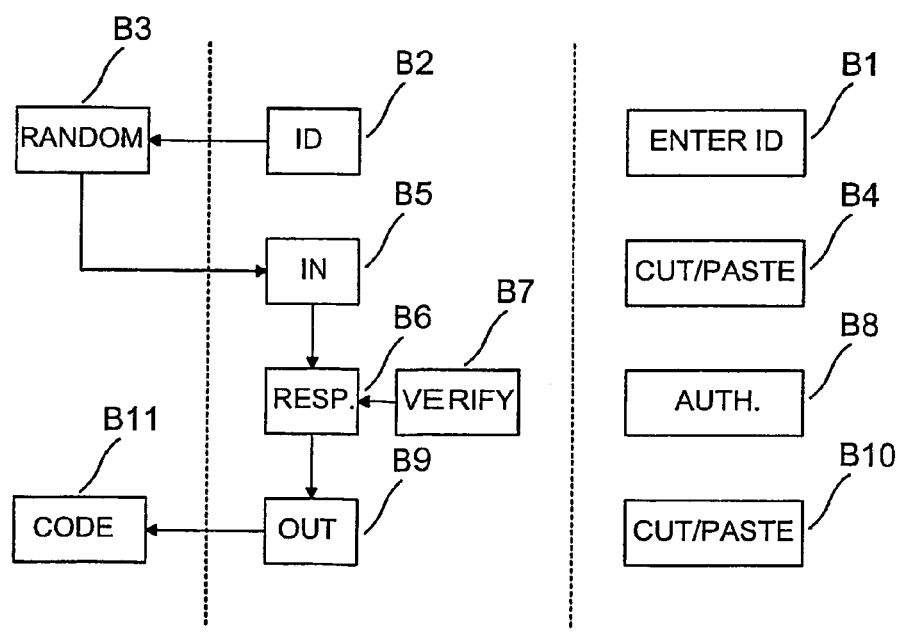
FIG. 2 shows an exemplary embodiment for the procedure according to the invention for releasing the access with the help of the portable data carrier and FIG. 3 shows a schematic view of the architecture of another exemplary embodiment of the portable data carrier according to the invention.

FIG. 2 shows an exemplary embodiment for the procedure according to the invention for releasing the access with the help of the portable data carrier 1. An action or several actions is/are represented by a block. Depending on whether the particular action is to be associated with a protected Internet page via which the access is to take place, with the portable data carrier 1 or with the user, the associated block is sketched in one of three columns. The left column shows the actions that take place on the Internet page. The middle column shows the actions of the portable data carrier 1. The right column illustrates the corresponding actions of the user.

In order to start the process according to the invention, the Internet page required for releasing the access is called with the personal computer 2 and the portable data carrier 1 is inserted into a port of the USB interface 7 of the personal computer 2 and activated as a result. As represented by a block B1, the user then enters a user ID on the called Internet page. The input can take place in such a manner, e.g., that the user transmits the user ID to the Internet page from a public area of the non-volatile memory 4 of the portable data carrier 1. This is represented as block B2. The public area of the non-volatile memory 4 is accessible from outside the portable data carrier 1. Therefore, commands available on a customary personal computer 2 such as "copy" or "cut" and "insert" can be used for the transmission. Alternatively, for transmission from the non-volatile memory 4 of the portable data carrier 1, it is also possible to enter the user ID via a keyboard of the personal computer 2 into the Internet page. In a further variant, the inputting of the user ID is entirely eliminated.

As the next action, a random number generated by an associated server is displayed on the Internet page. This is illustrated by a block B3. According to a block B4, the random number is transmitted by the user by the commands "cut" and "insert" from the Internet page into the public area of the non-volatile memory 4 of the portable data carrier 1. A Block B5 illustrates that the random number is used as input for generating a response, shown as a block B6, of the portable data carrier 1. However, as is indicated by a block B7, the response is only generated in case of a successful authentication of the user. The authentication takes place in the present exemplary embodiment of the process according to the invention by means of a verification of a fingerprint of the user. The user initiates the verification according to block B8, e.g., by placing a finger on the fingerprint sensor 5 or by executing a program in the non-volatile memory 4 of the portable data carrier 1. The fingerprint sensor 5 takes a picture whose features are extracted and compared with stored reference features. Alternatively, the authentication of the user can take place by inputting a personal identification number. After a successful authentication, the portable data carrier 1 generates the response. The random number is taken into account during the generation of the response. For example, a digital signature of the seized random number is computed for generating the response.

As represented by a block B9, the response is made available in the public area of the non-volatile memory 4 of the portable data carrier 1. According to block B10, the user transmits the response from the non-volatile memory 4 of the portable data carrier 1 onto the Internet page by using the commands "cut" and "insert". A block B11 indicates that the associated server verifies the correctness of the response and accordingly releases the access for the user.

If no security requirements that are too high are to be filled, a simplified variant of the process according to the invention without a random number can also be used. In this variant, the fingerprint of the user is again verified. In the case of a positive result, a one-time password is generated by the portable data carrier 1 and filed in the public area of the non-volatile memory 4 of the portable data carrier 1. The user transmits the one-time password onto the Internet page in the manner already described. The access for the user is thereupon released for a given time period. A further simplification of the process according to the invention can also be achieved in the variant in such a manner that, instead of the fingerprint, a personal identification number is used to authenticate the user. In this instance, an executable program is filed in the public area of the non-volatile memory 4 of the portable data carrier 1 that requests the inputting of the personal identification number of the user. The value entered by the user for the identification number is compared with a reference value and, if there is a coincidence, a one-time password is again generated, then is filed in the public area of the non-volatile memory 4 of the portable data carrier 1 and is transmitted from there by the user to the Internet page.

A browser implemented as an executable program in the portable data carrier 1 can also be used when carrying out the process according to the invention. The Internet pages via which the access can be released by the user can be saved as "favorites". It is not necessary in this variant to have recourse to the browser of the personal computer 2 and to use its security settings.

In all the process variants, security-relevant operations are executed by the security chip 6 and information to be kept secret is stored in the security chip 6. In particular, it can be provided that a biometric reference data set, which can be entirely or partially compared in integrated circuit 3 with current biometric raw data, is stored in the security chip 6.

Figure 3:
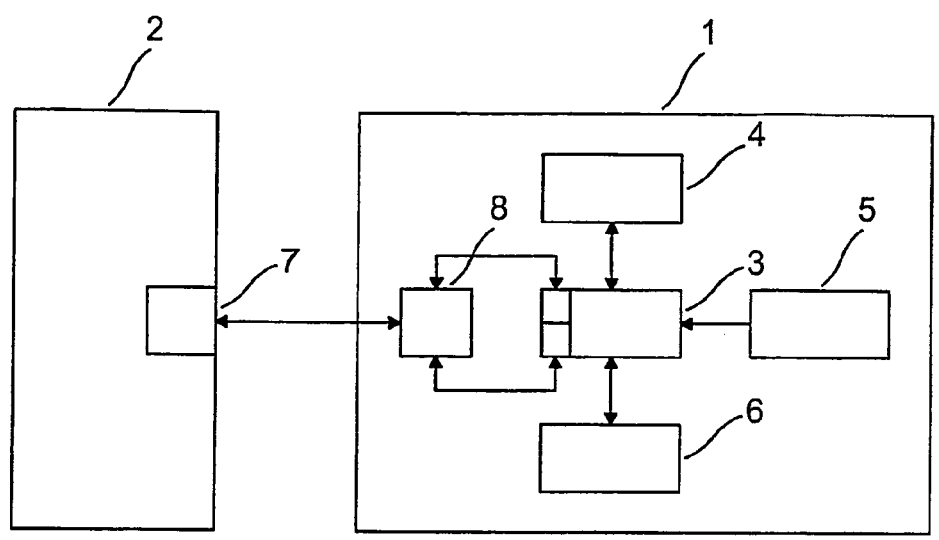

FIG. 3 shows a schematic representation of the architecture of another exemplary embodiment of the portable data carrier 1 according to the invention. This exemplary embodiment is characterized in that the portable data carrier 1 is connected via an integrated USB hub 8 to the USB interface 7 of the personal computer 2. The USB hub 8 makes it possible to connect two USB devices to the USB interface 7 of the personal computer 2. Two separate signal paths are formed in the portable data carrier 1 between the USB hub 8 and the integrated circuit 3. The integrated circuit 3 simulates a USB keyboard for the first signal path and accordingly registers itself as a second keyboard in the operating system of the personal computer 2. The USB keyboard is treated by the personal computer 2 like a physically present keyboard and its inputs are processed accordingly. A flash drive is implemented for the second signal path. The flash drive comprises an executable program that permits a selection among various Internet pages and services. Otherwise, the exemplary embodiment according to FIG. 3 corresponds to the exemplary embodiment shown in FIG. 1.

When the portable data carrier 1 designed according to FIG. 3 is being used, it is inserted into a port of the USB interface 7 of the personal computer 2. A desired Internet page is selected with the help of the executable program on the flash drive. Then, the user places the input marker on the Internet page into an input field provided for it and initiates the biometric user authentication by placing a finger on the fingerprint sensor 5 of the portable data carrier 1. After a successful authentication of the user, the portable data carrier 1 generates a one-time password and sends it via the first signal path to the input field of the Internet page. A manual transmission of the one-time password to the Internet page is not necessary since the keyboard is simulated for the first signal path and, as a consequence, an automatic transmission takes place. Likewise, it is also possible to send a user ID and a password that are stored in the portable data carrier 1 to appropriate input fields of the Internet page. The user can access a plurality of different Internet pages in the previously described manner without having to take notice of the particular associated user ID's and passwords since they are automatically entered into the input fields of the Internet page visited after a successful authentication of the user. The user ID and the password can also be entered into a local application or a network application with password protection instead of into an Internet page. In particular, an input into the welcome screen of an operating system is also possible. Furthermore, it is also conceivable to record an executable program for registering applications, Internet pages or services in the non-volatile memory 4. In this instance, the program can record the last user commands entered via the standard input device.

If the program recognizes a password-protected application or Internet page again for the first time, it can suggest the automatic registering of the login information to the user. Depending on the configuration settings of the program, the entry of the login information can automatically take place at the next calling if the user is authenticated relative to the token. Alternatively, the program can request the placement of the finger.

Otherwise, the process according to the invention described using FIG. 2 and its variants can also be used in an analogous manner in the exemplary embodiment of the portable data carrier 1 shown in FIG. 3. However, no manual command input is then required for the transmission of data from the portable data carrier 1 to the personal computer 2.

An important aspect of all variants of the process according to the invention is that it is not necessary to install software solely for the process on the personal computer 2. Standard software of the personal computer 2 and/or software implemented on the portable data carrier 1 can be used for carrying out the process.

The invention claimed is:

1. A process for releasing access to a computer system or to a program for a user via a terminal, comprising:
    establishing a data connection between the portable data carrier of a user and the terminal;
    performing an authentication of the user by the portable data carrier;
    if authentication is successful, making available an access code for releasing access to the computer system or to the program for a transmission via the data connection by the portable data carrier; and
    simulating an input device of the terminal by the portable data carrier through transmission of input data from the portable data carrier to an input field on the terminal so that no manual command input is required;
    wherein no specific software must be installed on the terminal solely for the purpose of releasing access to the computer system or to the program for a user via the terminal.

2. The process according to claim 1, wherein the data connection is established via a USB interface of the terminal.

3. The process according to claim 1, wherein the authentication is carried out on the basis of personal secret information entered by the user.

4. The process according to claim 1, wherein the authentication is carried out on the basis of a biometric process.

5. The process according to claim 4, wherein the biometric processing comprises checking a user fingerprint.

6. The process according to claim 1, wherein the access code is generated by the portable data carrier.

7. The process according to claim 6, wherein a random number made available from the computer system is taken into account during the generation of the access code.

8. The process according to claim 1, wherein at least one access code protected from unauthorized accesses is stored in the portable data carrier.

9. The process according to claim 1, wherein the access code for the transmission via the data connection is made available in a public area of a memory of the portable data carrier.

10. The process according to claim 1, wherein the access code is transmitted from the portable data carrier as an input of the simulated input device via the data connection.

11. The process according to claim 1, wherein the access code is transmitted to an Internet page.

12. The process according to claim 1, wherein software for establishing a connection to the computer system is stored in the memory of the portable data carrier.

13. The process according to claim 1, wherein the memory of the portable data carrier is operated as a disk drive.

14. A portable data carrier for releasing access to a computer system or to a program for a user via a terminal, comprising
 a security chip for making an access code available for the releasing of the access to the computer system or program, and
 a device for establishing a data connection to the terminal, wherein an authentication of the user can be carried out using the security chip, and wherein the portable data carrier simulates an input device of the terminal through transmission of input data from the portable data carrier to an input field on the terminal, so that no manual command input is required, and wherein no specific software must be installed on the terminal solely for the purpose of releasing access to the computer system or to the program for a user via the terminal.

15. The portable data carrier according to claim 14, including a device enabling the data carrier to be connected to a USB interface of the terminal.

16. The portable data carrier according to claim 14, including a USB hub by means of which the data connection to the terminal is separated in the portable data carrier into several separate signal paths.

17. The portable data carrier according to claim 14, including a memory configured as a flash EEPROM.

18. The portable data carrier according to claim 14, including a sensor arranged to detect biometric data.

19. The portable data carrier according to claim 18, wherein the biometric data sensor comprises a fingerprint sensor.

* * * * *